INVENTORS
RICHARD J. COBURN
KERMIT I. HARNER
BY *Harris G. Luther*
ATTORNEY

INVENTORS
RICHARD J. COBURN
KERMIT L. HARNER
BY Harris G. Luther
ATTORNEY

United States Patent Office 3,003,331
Patented Oct. 10, 1961

3,003,331
ELECTRONIC BACK PRESSURE CONTROL
Richard J. Coburn, Newington, and Kermit I. Harner, Windsor, Conn., assignors to United Aircraft Corporation, East Hartford, Conn., a corporation of Delaware
Filed Dec. 5, 1958, Ser. No. 778,489
19 Claims. (Cl. 62—161)

This invention relates to a control mechanism and particularly to mechanism for controlling an air conditioning system.

More specifically, this invention relates to refrigerant pressure responsive mechanism for creating an electric signal and a motor controlled by that signal for regulating the refrigerant pressure.

An object of this invention is mechanism converting a pressure error signal into a proportional electrical error signal and means integrating said error signal and accordingly positioning pressure control means to modify said pressure and eliminate said error.

A further object is mechanism which will automatically close a valve in the line connecting a refrigerant evaporator outlet with a compressor inlet whenever the compressor is shut down and prevent restarting said compressor until said valve is closed.

A further object is mechanism which will maintain a preselected temperature in an enclosure cooled by a refrigerating system and including means which will override said mechanism and reduce the compressor load when the compressor is overloaded, which may be indicated either by the compressor outlet pressure or the compressor motor current.

Other and further objects and advantages will be apparent from the following specification and the attached drawings in which.

Figure 1:
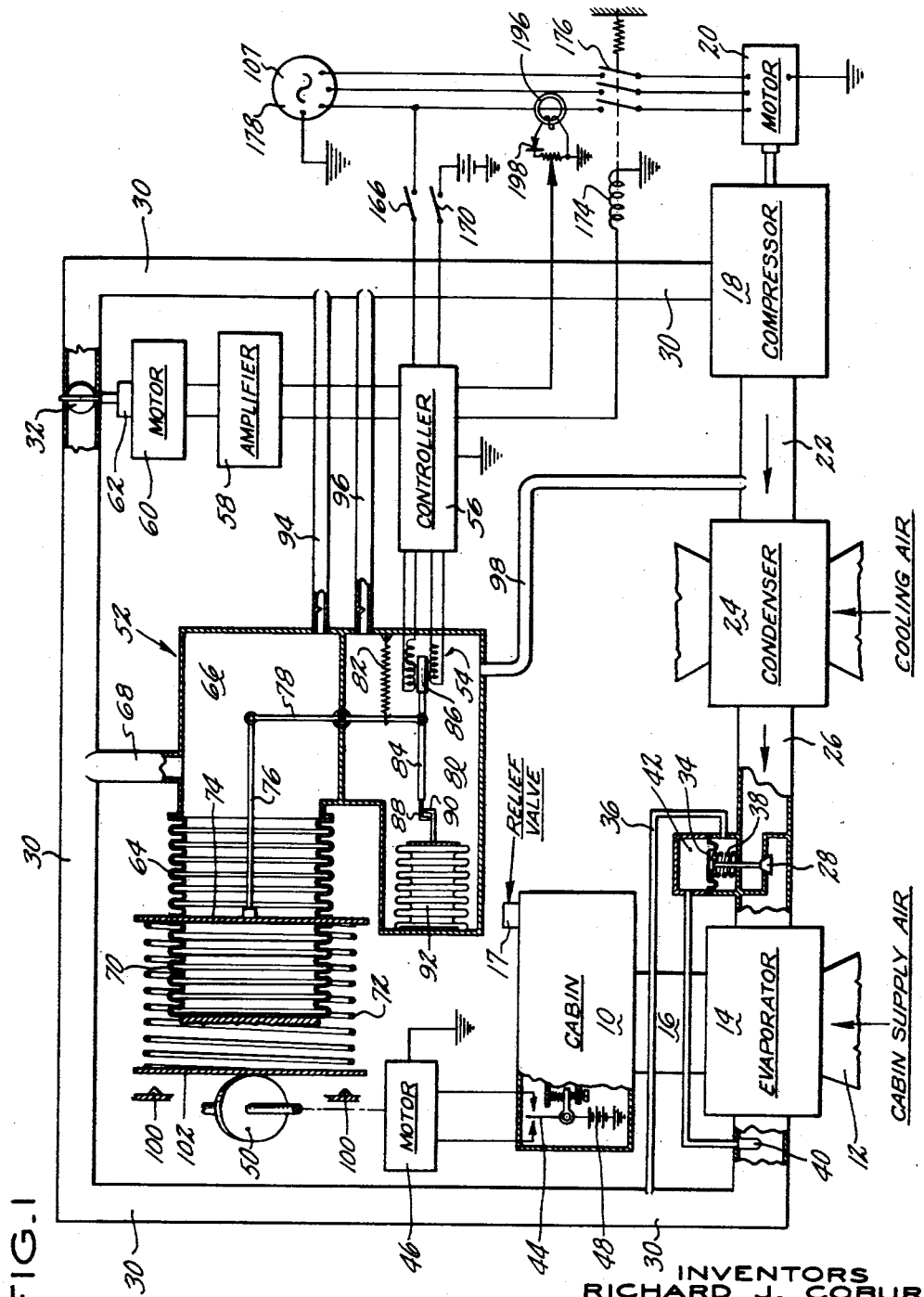
FIG. 1 is a schematic drawing showing an airplane cabin air conditioning mechanism including the control mechanism for the pressure regulating valve.

One of the problems in the air conditioning of airplane compartments is that of accurately maintaining a selected temperature with rapidly varying conditions to which an airplane is subjected. In an air conditioning system using a refrigerant evaporator for cooling the cabin air supply, the problem is one of maintaining the evaporator at the proper temperature to cool the incoming air to correct amount so that the resultant air temperature will provide the selected cabin air temperature.

The cabin air supply, especially for pressurized cabins, is usually air under pressure at a somewhat elevated temperature, which air must be cooled to bring it down to the desired temperature for the enclosure air supply. The quantity of air supplied is in accordance with a preselected schedule and maintains the flow substantially constant so as to give a preselected rate of change of cabin air and also maintain the preselected pressurization schedule as the ambient pressure changes.

As the cooling requirements vary materially with the change in ambient temperature and with the change in the pressure rise in the supercharger or the compressed air source furnishing the cabin air supply, it is necessary to vary the back pressure in the evaporator to thus vary the temperature maintained by the evaporator to provide the varying cooling requirements for the cabin air supply. If it is attempted to provide the change in requirements simply by operation of a throttle valve without reference to the pressure limitations, it is possible under some conditions to overload the refrigerant compressor and under other conditions to freeze up the cabin air supply portion of the evaporator. By utilizing the control, forming the subject of this invention, a stop can be provided on the pressure regulator limiting the pressure change to a preselected amount which will prevent a reduction of temperature in the evaporator that would cause freezing. Mechanism can also be provided to prevent an increase in compressor outlet pressure or to prevent an increase in the current consumption of the compressor motor to such an extent that the compressor or motor would be overloaded.

Referring to the drawings, an enclosure 10, which may be any portion of the airplane which it is desired to cool and which for convenience in terminology has been indicated as an airplane cabin compartment, is supplied with air from any suitable source, not shown, which may be ram air or recirculated cabin air or air from the supercharger or bleed air from a gas turbine compressor. The air supply is led through a duct 12 and through a heat exchanger 14 and a duct 16 to the cabin 10, from which it may be discharged through a relief or pressure control valve 17. The heat exchanger 14 has one set of passages for the cabin air supply and another set of passages forming an evaporator for a refrigerant used for cooling the cabin air supply. A refrigerant compressor 18 is driven by any suitable source of power such as an electric motor 20 and discharges refrigerant gas under pressure through a line 22 to the condenser 24 where the gas is condensed to a liquid. The condenser is a heat exchanger and is cooled by any suitable means such as air which may be either ram air or fan-propelled air. The cooled liquid is led through a line 26 and through a suitable expansion valve 28 to the evaporator 14 and then through the line 30 back to the compressor inlet. A throttle valve 32 of any suitable type, but which is shown as a butterfly valve, controls the flow of low pressure refrigerant gas through the line 30 and thus serves as a variable restriction controlling the pressure or back pressure in the evaporator 14. The preferred refrigerant is one of the Freons, preferably Freon 114, whose temperature will vary in accordance with the pressure maintained in the evaporator. Hence, by operating valve 32 to maintain a selected pressure in the evaporator, it is possible to maintain a selected temperature in the Freon evaporator. The expansion valve 28 is adjustable by means of the pressures on opposite sides of a diaphragm 34. A line 36 conducts evaporator pressure to the underside of the diaphragm and assists a spring 38 in closing the expansion valve 28. A temperature responsive bulb 40 controls the pressure on the upper side 42 of the diaphragm 34 and will open the valve whenever the temperature in the evaporator outlet is a preselected amount above the boiling temperature of the Freon indicating a selected amount of superheat. Opening or further opening of the expansion valve 28 will permit more Freon to pass through the evaporator and reduce the temperature at the outlet and, incidentally, cause an increase in outlet pressure. The expansion of the additional Freon permitted to further opening of the valve 28 will reduce the temperature in the evaporator so that the cabin supply air passing through the evaporator will be unable to raise the temperature of the added quantity of Freon vapor to as high a temperature.

A thermostat 44 which may be an adjustable bimetallic element located in the compartment to be controlled, and as shown in the cabin 10 controls a servo motor 46 which is a reversible electric motor energized by the battery 48 or other suitable source of power to actuate a cam 50 to select the temperature to be maintained in the evaporator 14 by regulating the pressure in the line 30 to give the cabin 10 a temperature selected by the thermostat 44. The mechanism for actuating the valve 32 comprises a pressure responsive device indicated generally at 52 operating a transducer 54 which will supply an error signal to a controller 56 which will supply through the amplifier 58 an electric current for actuating the reversible servo motor 60 connected through the reduction gear 62 to the valve 32.

A pressure responsive mechanism comprises a bellows 64 forming part of a chamber 66 connected through lines 68 and 30 to the evaporator outlet upstream of the valve 32. Bellows 64 is opposed by an evacuated bellows 70 having one end fixed to the same support as the open end of bellows 64 and a spring 72 whose force may be adjusted by the cam 50. The plate 74, forming one end of the bellows 64, is connected through a rod 76 to a lever 78 pivoted in one wall of the chamber 66 and passing through that wall into a chamber 80. A light spring 82 continuously urges lever 78 in one direction and holds the rod 76 in position against the plate 74. A rod 84 carried by the end of the lever 78 to the chamber 80 has a slug 86 at one end which is moved by movement of the lever 78 between the coils of the transducer 54 to produce the pressure error signal. The opposite end of the rod 84 carries a hook 88 cooperating with a hook 90 carried by evacuated bellows 92, the two hooks forming a lost motion connection between the evacuated bellows 92 and the lever 78. Lines 94 and 96 connect the chambers 66 and 80, respectively, with the compressor inlet to withdraw any condensation that may form. Chamber 80 is connected by a line 98 with the compressor outlet 22. Evacuated bellows 92 will be compressed by a compressor outlet pressure above a preselected value, so as to move slug 86 to a position which will close the back pressure valve 32 and thus reduce the load on the compressor and prevent overloading of the compressor.

Stops 100 are positioned to limit the travel of plate 102 controlling the position of one end of spring 72 to thereby limit the reduction in pressure in line 30 to a pressure which will be a few degrees above freezing.

Figure 2:
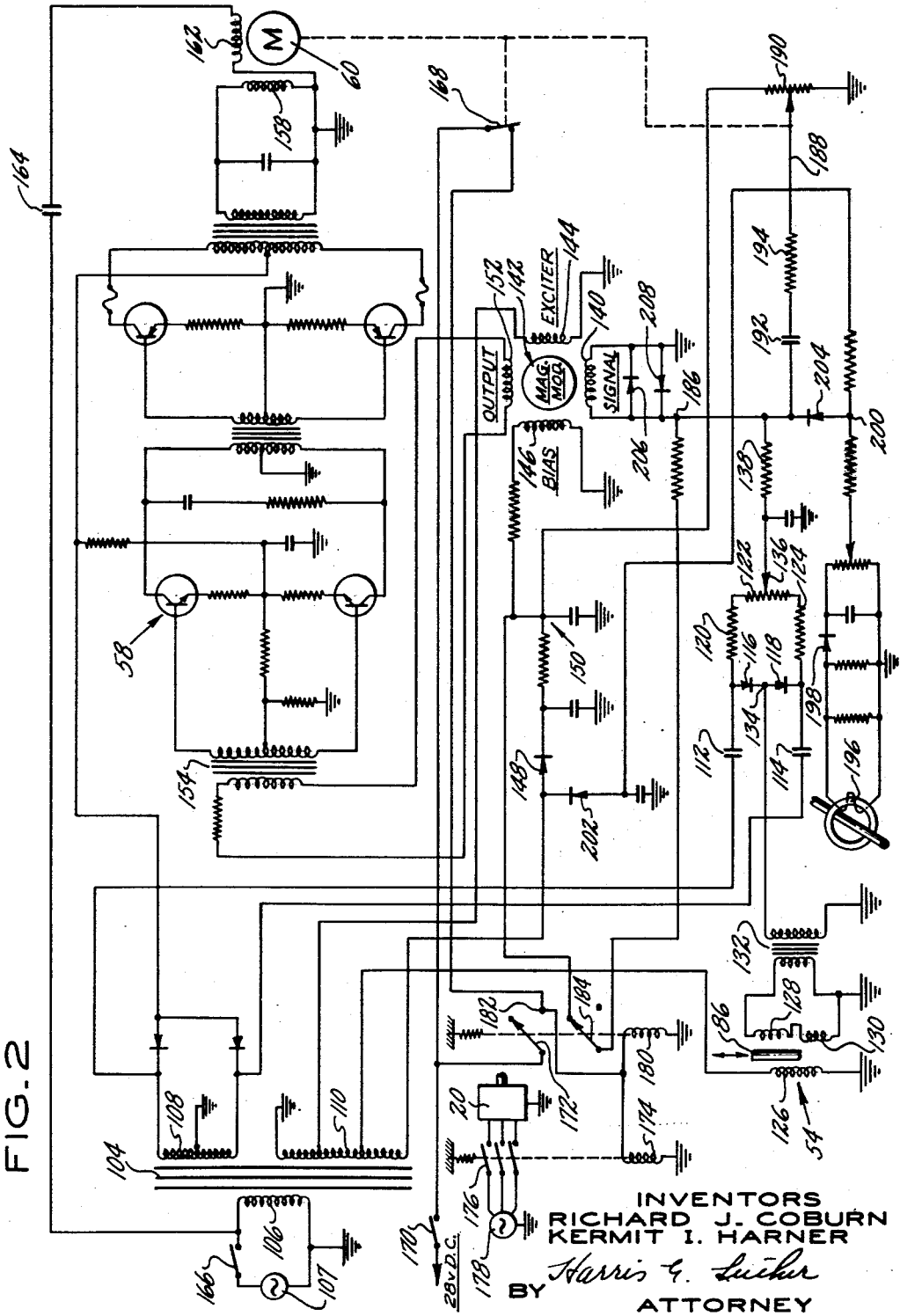
FIG. 2 is a wiring diagram of the controller and its associated mechanism.

The controller 56 and its associated mechanism shown in more detail in FIG. 2, comprises a transformer 104 having a primary winding 106 connected with a source 107 of alternating current and secondary windings 108 and 110. The secondary winding 108 is connected to a pair of series connected condensers 112, 114, separated by a pair of series connected rectifiers 116, 118 arranged to conduct in the same direction so as to charge the condensers 112, 114 in one direction from the alternating current output of the secondary winding 108. The condensers 112, 114 are also connected by a series of resistors 120, 122 and 124. The transducer 54 comprises a coil which may be inductively connected with a pair of oppositely wound coils 128 and 130 through the slug 86.

The coils 128, 130 are connected through a transformer 132 to a point 134 between the rectifier 116 and 118 which is normally the zero voltage with respect to ground. Movement of the slug 86 in either direction from a central position where it will induce equal and opposite voltages in the coils 128 and 130, will tend to uncouple one of the coils while inducing full voltage in the other and thus provide an alternating voltage at 134 which will be either in phase or 180° out-of-phase with the charging current for the condensers 112 and 114. This will produce a bias voltage at the point 134 which will produce a similar bias voltage at the midpoint of resistance 122 selected by the slider 136 and connected through resistor 138 with the signal coil 140 of a magnetic modulator indicated generally at 142. The magnetic modulator has an exciter coil 144 continuously supplied with alternating current from the secondary winding 110 and also has a bias coil 146 continuously supplied with rectified D.C. voltage from the secondary winding 110 and rectifier 148 and the filtering network 150. The output coil 152 of the magnetic modulator supplies alternating current through a transformer 154 to a transistor push-pull amplifier indicated generally at 58 which in turn supplies alternating current to one field winding 158 of a two-phase motor 60. The other field winding 162 of the two-phase motor is continuously supplied through a condenser 164 with alternating current which may be from the source 107. The current in winding 158 will be either in phase or 180° out-of-phase with the power source 107 while the current in winding 162 will have a 90° lead with respect to the power source so that the two-phase motor 60 may be driven in either direction, depending upon the polarity of the signal supplied to the junction 134 by the transducer 54.

Switch 166 is normally closed to continuously supply alternating current to the controller, but may be opened when it is desired to completely disable the controller.

Motor 60 is connected with the switch 168 and the valve 32 and is effective to close the switch 168 only when the valve 32 is closed or substantially closed. This switch will act as a safety device and prevent starting of the Freon compressor except when the valve 32 is closed and will thus prevent overloading of the compressor during starting.

In order to start the Freon compressor, a switch 170 connected with a direct current source, is closed and through switch 172 and switch 168 will supply direct current to relay 174 and close the gang switch 176 supplying alternating current from the source 178 to the compressor motor 20. At the same time relay 180 will be energized to move switch 172 to contact 182 and short-circuit the switch 168 and open switch 184. Before closing switch 170 and with switch 184 closed, a positive signal is supplied from the rectifier 148 and the filter 150 through switch 184 and junction 186 to the signal winding 140 of the magnetic modulator to energize the motor 60 and turn the valve to a closed position so that whenever the Freon system is shut down, as by opening the switch 170, the valve 32 is moved to a closed position as is the switch 168 to set both the Freon system and the electric system for again starting the Freon compressor.

Opening of the switch 184 by the relay 180 will disconnect the positive signal from filter 150 from the signal coil 140 and permit the transducer 54 to supply a controlling signal for the motor 60. The positive signal from the filter 150 is always large enough to overcome any contrary signal supplied by the transducer 54. The motor 60 is also connected with a slider 188 of the potentiometer 190 so as to supply a negative feedback signal whenever the slider 188 is moving and the condenser 192 is being charged or discharged by the changing voltage from the potentiometer 190. The voltage supplied by the movement of the slider 188 is dependent upon its rate of movement and supplies a temporary bias which will tend to stabilize the system and prevent or reduce hunting and overshooting. The condenser 192 and the resistor 194 are proportioned to give the desired time lag in this rate responsive voltage.

In order to prevent overloading of the compressor motor 20, a current responsive pick-off 196 is applied to one of the mains leading to the motor 20 and through rectifier 198 will supply a positive voltage to the junction 200 connected with the signal coil 140 of the magnetic modulator. The secondary 110 of the main transformer will supply through the rectifier 202 a negative voltage to the junction 200 which is normally larger than the positive voltage supplied by the pick-off 196. A rectifier 204 will prevent transmission of the negative signal to coil 140 but will permit the transmission of a positive signal when it predominates. The positive signal provided by the pick-off 196 is proportional to the current supplied to the motor 20 and an overload on the motor will provide a positive signal at 200 greater than the negative signal from the transformer 110 and will thus supply a positive signal to the coil 140 and move the valve 32 toward a closed position to relieve the load on the compressor and thus relieve the load on the motor. Rectifiers 206 and 208 are limiters which will prevent an excessive current through the signal coil 140 of the magnetic modulator and thus also act to limit the maximum rate of back pressure valve travel.

In operation, the bimetallic thermostat 44 or other temperature responsive element in the cabin 10 will energize motor 46 and position the plate 102 to set the force of spring 72 whenever the cabin temperature differs from a preselected temperature. Whenever the Freon pressure in chamber 66 and the evaporator outlet differs from that selected by the force of spring 72, slug 86 will be moved in one direction or the other from its central position and create a signal proportional to the pressure difference which will energize motor 60 to turn it in one direction or the other and change the position of valve 32 proportional to the pressure difference signals to vary the pressure in chamber 66 in a direction to remove the signal which started actuation of the motor 60. Changing of the pressure in chamber 66 and the evaporator outlet 30 will change the temperature of the air entering the cabin 10 and through the bimetallic element 44 will reset the force of spring 72 to select a new reference pressure.

Excessive pressure in the compressor outlet will actuate slug 86 to give a valve closing signal to controller 56 and move valve 32 toward closed position. Overload current in the feed line to compressor motor 20 will supply a valve closing signal through rectifier 204 to controller 56 and move valve 32 toward closed position. Motor 60 in moving valve 32 will produce a negative feedback signal through slider 190 and tend to stabilize the system.

When switch 170 is opened to stop the Freon system, the relays 174 and 180 will open switch 176 to stop motor 20, close switch 184 to apply a valve closing signal to controller 56 and motor 60 and open switch 172 to eliminate the shorting of switch 168. Motor 60 in moving valve 32 to closed position will close valve 168 arming the system for starting again with valve 32 closed to prevent overloading of the compressor on starting.

Figure 3:
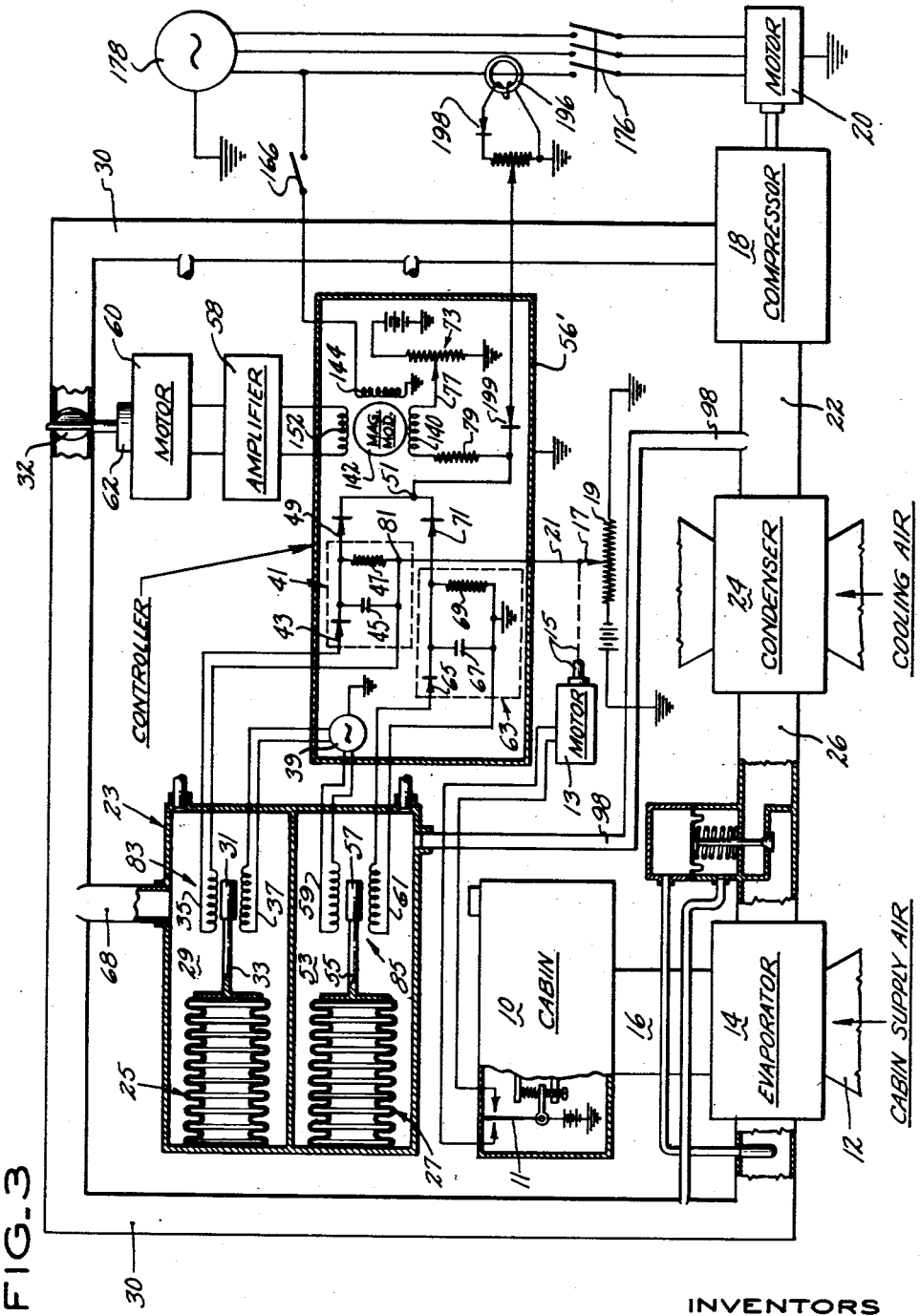
FIG. 3 is a wiring diagram of the modified form of the controller and its associated mechanism.

A more flexible method of regulating the refrigerant fluid flow and thus the cabin temperature, is shown in FIG. 3. A temperature sensing device 11 such as a thermostat is located in cabin 10 and will actuate reversible motor 13 in response to a difference between the actual temperature and the desired temperature in cabin 10. Shaft 15, rotated by motor 13, will move arm 17 of potentiometer 19, and vary the voltage transmitted to junction 81 of controller 56' through control line 21.

A pressure responsive device indicated generally by numeral 23 includes evacuated bellows 25 and evacuated bellows 27. Chamber 29 senses the outlet pressure of evaporator 14 through lines 68 and 30. One end of bellows 25 is fixed and the other end is connected to slug 31 by rod 33. Slug 31 and coils 35 and 37 form a transducer 83 which will respond to movement of bellows 25. Coil 37 is connected to a source of alternating voltage 39 located in controller 56'. Coil 35 receives the output of the transducer which is determined by the position of slug 31, and transmits the induced output signal through a rectifier circuit 41 comprising diode 43, capacitor 45, resistor 47 and through diode 49 to junction 51. Bellows 27 is located in a chamber 53 and the chamber is connected through lines 98 and 22 to the outlet of compressor 18. Bellows 27 is also fixed at one end and is connected through rod 55 to slug 57 which, together with coils 59 and 61 comprise a second transducer 85. The output signal from this transducer is transmitted from coil 61 through rectifier circuit 63 comprising diode 65, capacitor 67 and resistor 69 and through diode 71 to junction 51. Arm 77 of potentiometer 73 is connected to junction 51 through resistor 79 and signal winding 140 of magnetic modulator 142. The signals of output winding 152 of magnetic modulator 142 as modulated by the signals in winding 140 are fed through amplifier 58 to reversible motor 60 which, through reduction gear 62, will actuate valve 32.

The position of valve 32 controls the flow of refrigerant fluid through the system, so that any movement of valve 32 will change the cooling effect produced in cabin 10. Junction 51 is always more positive than potentiometer 73, and magnetic modulator 142 is adjusted so that the null position occurs when a specified potential difference exists across signal winding 140. Hence when the voltage at junction 51 is varied by error signals, as will be described later, the potential difference across winding 140 will decrease or increase and output winding 152 will sense the change in signal across winding 140 and actuate reversible motor 60 to initiate a corresponding opening or closing movement on valve 32. Arm 77 can also be moved and is utilized as a fine adjustment of the system. The voltage output from coil 35 is rectified in such a manner as to provide an increase in the voltage supplied to rectifier 49 as the evaporator outlet pressure and hence the pressure in chamber 29 decreases. The voltage output from coil 61 is rectified in such a manner as to provide an increase in voltage supplied to rectifier 71 as the compressor outlet pressure increases. The output signal from transducer 83 is rectified by circuit 41 where it combines at junction 81 with the signal produced by potentiometer 19 in response to the cabin temperature. The signal which now passes through diode 49 will comprise the rectified signal from transducer 83 which is proportional to the evaporator outlet pressure, combined with the positive D.C. signal from potentiometer 19. The output signal from transducer 85 is rectified by circuit 63 and passes directly through diode 71 to junction 51. Junction 51 will thus be held at the more positive of the signals passed by diodes 49 and 71.

When the system is at steady state, a voltage producing a null output signal in output winding 152 will exist at junction 51. If, for example, cabin 10 now calls for more cooling, arm 17 of potentiometer 19 will be actuated in the direction to decrease the voltage transmitted to junction 81 and thus lower point 51. This creates a signal across signal winding 140 which will actuate motor 60 and start opening valve 32 to supply more cooling to cabin 10. As valve 32 opens, the evaporator outlet pressure decreases, bellows 25 expands and causes transducer 83 to send a positive signal through rectifier 41 to junction 51, tending to eliminate the cabin temperature error signal which has originally lowered point 51. Should the pressure in chamber 29 become so low as to indicate that the evaporator back pressure is near the level which would cause evaporator freeze-up, the positive signal produced by transducer 83 will assume complete control and close valve 32. To accomplish this function, the signal produced by potentiometer 19 is limited. It may also occur that opening valve 32 and supplying more fluid will cause an overload in compressor 18, which will be indicated by a large rise in compressor outlet pressure. If bellows 27 senses this condition, transducer 85 will send a positive signal to junction 51 which will close valve 32 and eliminate the overload. When the compressor overload signal is the controlling signal, it is obvious that any signal from cabin 10 to increase the cooling will be ineffective. Under no conditions will the cabin temperature control be effective to open valve 32 and supply more cooling if the evaporator pressure is near the freezing level or if the compressor outlet pressure indicates near overload conditions. Conversely, a signal from the cabin to close valve 32 and increase the temperature in cabin 10 will always be effective.

Overload current in the feed line to compressor motor 20 will supply a signal in the direction to close the valve through rectifier 199. Junction 51 is always at a positive potential, and rectifier 199 will thus be reverse biased until the compressor motor current becomes large enough to induce a voltage in current responsive pick-up 196 to overcome the reverse bias and force junction 51 more positive, which is in the direction to close valve 32.

It will be understood that although both the compressor pressure override and the motor current override have been shown in FIG. 3, either override and its function may be omitted.

What has thus been described is a control system which will permit the cooling demands of the compartment to be met until either the system is in danger of freezing up or the compressor becomes overloaded, at which time no further cooling is permitted and steps are taken to eliminate the undesirable conditions.

It should be understood that the invention is not limited to the particular embodiments shown and described herein, but that various changes and modifications may be made in the construction and arrangement of the parts without departing from the scope of this novel concept as defined in the following claims.

We claim:

1. In a refrigeration system, a refrigerant evaporator, a compressor, a conduit connecting said evaporator outlet with said compressor inlet, a variable restriction in said conduit, a motor, means mechanically connected with said motor for varying said restriction, normally inactive means for urging said motor in a direction to close said restriction, a compressor motor, switch means for connecting said compressor motor with a source of power, means automatically activating said normally inactive means upon opening said switch means.

2. In a refrigeration system, a refrigerant evaporator, a compressor, a conduit connecting said evaporator outlet with said compressor inlet, a variable restriction in said conduit, a motor for varying said restriction, means producing a control signal for urging said motor in a direction to close said restriction, means converting said control signal into motor movement, a compressor motor, switch means for connecting said compressor motor with a source of power, means automatically applying said control signal to said converting means upon opening said switch means.

3. In a refrigeration system, a refrigerant evaporator, a compressor, a conduit connecting said evaporator outlet with said compressor inlet, a variable resriction in said conduit, a motor for varying said restriction, means producing a control signal for urging said motor in a direction to close said restriction, means converting said control signal into motor movement, a compressor motor, a first switch means connecting said control signal producing means with said converting means, a second switch means connecting said compressor motor with a source of power, means simultaneously actuating said both switch means to disconnect said control signal and connect said compressor motor.

4. In a refrigeration system, a refrigerant evaporator, a compressor, a conduit connecting said evaporator outlet with said compressor inlet, a variable restriction in said conduit, a motor for varying said restriction, means producing a control signal for urging said motor in a direction to close said restriction, means converting said control signal into motor movement, a compressor motor, first switch means connecting said control signal producing means with said converting means, second switch means connecting said compressor motor with a source of power, means simultaneously actuating both said switch means to disconnect said control signal and connect said compressor motor, a third switch means, means actuated by said restriction varying motor closing said third switch means upon closing of said restriction, means connecting said third switch means with said actuating means and preventing operation of said actuating means with said third switch means open.

5. In a refrigeration system, a refrigerant evaporator, a compressor, a conduit connecting said evaporator outlet with said compressor inlet, a variable restriction in said conduit, a motor for varying said restriction, means producing a control signal for urging said motor in a direction to close said restriction, means converting said control signal into motor movement, a compressor motor, a first switch means connecting said control signal producing means with said converting means, a second switch means, including a relay, connecting said compressor motor with a source of power, a relay actuating said first switch means to disconnect said control signal from said converting means, and means for simultaneously actuating said relays.

6. In a refrigeration system, a refrigerant evaporator, a compressor, a conduit connecting said evaporator outlet with said compressor inlet, a variable restriction in said conduit, a motor for varying said restriction, means responsive to the evaporator outlet pressure producing an electrical error signal responsive to the variation of said pressure from a preselected value, means converting said error signal into motor movement to eliminate said signal, means responsive to system shut-down producing a control signal overriding said error signal and urging said motor in a direction to close said restriction, a compressor motor, a first switch means connecting said control signal producing means with said converting means, a second switch means, including a relay, connecting said compressor motor with a source of power, a relay actuating said first switch means to disconnect said control signal from said converting means, means for simultaneously actuating said relays to start said compressor, disconnect said control signal and establish control by said error signal.

7. In a refrigeration system, a refrigerant evaporator, a compressor, a conduit connecting said evaporator outlet with said compressor inlet, a variable restriction in said conduit, a motor for varying said restriction, means producing a control signal for urging said motor in a direction to close said restriction, means converting said control signal into motor movement, a compressor motor, a first switch means connecting said control signal producing means with said converting means, a second switch means, including a relay, connecting said compressor motor with a source of power, a relay actuating said first switch means to disconnect said control signal from said converting means, means for simultaneously actuating said relays, including a third switch means in the circuit of both relays, means connecting said third switch means with said valve motor for opening and closing said third switch means with said valve, and preventing initial energization of said relays except when said valve is closed.

8. In a refrigeration system, a refrigerant evaporator, a compressor, a conduit connecting the evaporator outlet with said compressor inlet, a variable restriction in said conduit, a motor for varying said restriction, means producing a control signal for urging said motor in a direction to close said restriction, means converting said control signal into motor movement, a compressor motor, a first switch means connecting said control signal producing means with said converting means, a second switch means connecting said compressor motor with a source of power, switch actuating means for simultaneously actuating said first and second switch means to disconnect said control signal and connect said compressor motor, a third switch means controlling said switch actuating means, means connecting said third switch means with said valve motor for opening and closing said third switch means with said valve and preventing initial operation of said switch actuating means except when said valve is closed and a fourth switch actuated by said switch actuating means and short-circuiting said third switch means upon actuation of said first and second switch means.

9. In a refrigeration system, a refrigerant evaporator, a compressor, a conduit connecting the evaporator outlet with said compressor inlet, a variable restriction in said conduit, a motor for varying said restriction, means responsive to the evaporator outlet pressure producing an electrical error signal responsive to the variation of said pressure from a preselected value, means converting said error signal into motor movement to eliminate said error signal, means responsive to system shut-down producing a control signal overriding said error signal and urging said motor in a direction to close said restriction, switch means connecting said control signal with said converting means, a motor for said compressor, control means for said compressor motor, means connecting said switch means and said compressor motor control means for closing said switch means and closing said restriction upon disabling actuation of said compressor motor control means.

10. In a refrigeration system, a refrigerant evaporator, a compressor, a conduit connecting said evaporator outlet with said compressor inlet, a valve controlling the fluid flow in said conduit, a motor for actuating said valve, means responsive to evaporator outlet pressure, transducer means positioned by said evaporator outlet pressure responsive means and converting variations of said outlet pressure, from a preselected value, into a motor actuating signal, means responsive to compressor outlet pressure connected to said transducer means and operable by a compressor outlet pressure above a predetermined value to override the effect of said evaporator outlet pressure responsive means and position said transducer means to produce a motor actuating signal to close said valve.

11. In a refrigeration system, a refrigerant evaporator, a compressor, a conduit connecting said evaporator outlet with said compressor inlet, a valve controlling the fluid flow in said conduit, a motor for actuating said valve, means responsive to the evaporator outlet pressure, a transducer positioned by said evaporator outlet pressure responsive means and converting variations of said evaporator outlet pressure, from a preselected value, into a motor actuating signal, means responsive to compressor outlet pressure connected to said transducer and operable by a compressor outlet pressure above a predetermined value to override said evaporator outlet pressure responsive means and position said transducer to produce a motor actuating signal to close said valve.

12. In a refrigeration system, a refrigerant evaporator, a compressor, a conduit connecting said evaporator outlet with said compressor inlet, a valve controlling the fluid flow in said conduit, a motor for actuating said valve, means responsive to evaporator outlet pressure, a first transducer positioned by said evaporator outlet pressure responsive means and converting variations of said outlet pressure, from a preselected value, into a motor actuating signal, means responsive to compressor outlet pressure, a second transducer positioned by said compressor outlet pressure responsive means and converting a compressor outlet pressure above a predetermined value into a motor actuating signal to override said first motor actuating signal and close said valve.

13. In a refrigerating system for regulating the temperature in an enclosure, a refrigerant evaporator, a compressor, a conduit connecting said evaporator outlet with said compressor inlet, a valve controlling the fluid flow in said conduit, a motor for actuating said valve, means responsive to variations in said enclosure temperature from a preselected value producing an error signal, means responsive to evaporator outlet pressure, transducer means positioned by said evaporator outlet pressure responsive means and converting variations of said evaporator outlet pressure, from a preselected value, into a second error signal, means combining said enclosure temperature error signal with said evaporator outlet pressure error signal and producing a motor actuating signal, means responsive to compressor outlet pressure above a predetermined value, said transducer means being positioned by said compressor outlet pressure responsive means and producing a signal overriding said motor actuating signal and closing said valve.

14. In a refrigerating system for regulating the temperature in an enclosure, a refrigerant evaporator, a compressor, a conduit connecting said evaporator outlet with said compressor inlet, a valve controlling the fluid flow in said conduit, a motor for actuating said valve, means responsive to variations in said enclosure temperature from a preselected value producing an error signal, means responsive to variations in evaporator outlet pressure from a preselected value producing a second error signal, means combining said enclosure temperature error signal with said evaporator outlet pressure error signal for producing a motor actuating signal, and means responsive to the compressor outlet pressure above a predetermined value for producing a signal overriding said motor actuating signal and closing said valve.

15. In a refrigerating system for regulating the temperature in an enclosure, a refrigerant evaporator, a compressor, a conduit connecting said evaporator outlet with said compressor inlet, a valve controlling the fluid flow in said conduit, a motor for actuating said valve, means responsive to variations in said enclosure temperature from a preselected value producing an error signal, means including transducer means responsive to variations in evaporator outlet pressure from a preselected value producing a second error signal and combining said enclosure temperature error signal with said evaporator outlet pressure error signal for producing a motor actuating signal, and transducer means responsive to the compressor outlet pressure above a predetermined value for producing a signal overriding said motor actuating signal and closing said valve.

16. In a refrigerating system for regulating the temperature in an enclosure, a refrigerant evaporator, a compressor, a conduit connecting said evaporator outlet with said compressor inlet, a valve controlling the fluid flow in said conduit, a motor for actuating said valve, means responsive to variations in said enclosure temperature from a preselected value for actuating said motor, and means responsive to compressor outlet pressure above a preselected value for producing a signal overriding said motor actuating signal and closing said valve.

17. In a refrigeration system, a refrigerant evaporator, a compressor, a conduit connecting said evaporator outlet with said compressor inlet, a valve controlling said conduit, a motor for actuating said valve, means responsive to evaporator outlet pressure, a transducer responsive to said means transforming variations of said outlet pressure from a preselected value into error signals, a compressor motor, means transforming an overload current in the compressor motor circuit into overload signals, means combining said error signals with said overload signals, means converting the combined signals into valve closing motor movement when said overload signals exceed said error signals, means responsive to compressor outlet pressure, means connecting said compressor outlet pressure responsive means with said transducer and operable by a compressor outlet pressure above a preselected value to override said evaporator outlet responsive means and position said transducer to produce a valve motor closing signal.

18. Control means for a refrigerating system having a motor driven compressor, an evaporator receiving the product of the compressor and delivering expanded refrigerant to the compressor inlet and a valve controlling the evaporator back pressure, comprising, a valve actuating motor, means producing control signals responsive to variations of said back pressure from a preselected value, converter means converting said control signals into valve motor actuating energy, means continuously supplying said signals to said converter means, means continuously creating an overriding valve closing signal, means associated with said compressor motor connecting said overriding signal with said converting means when said compressor motor is inactivated and disconnecting said overriding signal from said converting means when said compressor motor is activated, means responsive to an overload on said compressor motor creating an overload signal, means limiting said signal to a valve closing signal and connecting said limited signal to said converting means.

19. In a refrigerator system having a compressor, an evaporator, a conduit connecting the outlet of the evaporator with the inlet of the compressor and a variable restriction in said conduit, means responsive to the pressure in the evaporator outlet upstream of said restriction producing an error signal proportional to the variation of said pressure from a selected value, a motor integrating said error signal and moving said variable restriction in accordance with said integrated signals, an expansion valve at the entrance to said evaporator, means responsive to the pressure and temperature of the evaporator controlling said expansion valve to limit the superheat in the gas in the evaporator outlet, said motor changing the evaporator outlet pressure at a slower rate than said expansion valve.

References Cited in the file of this patent

UNITED STATES PATENTS

| | | |
|---|---|---|
| 1,238,051 | Peterson | Aug. 21, 1917 |
| 1,422,853 | Hansen | July 18, 1922 |
| 2,282,880 | Oergel | May 12, 1942 |
| 2,316,066 | Haymond | Apr. 6, 1943 |
| 2,581,956 | Jones | Jan. 8, 1952 |
| 2,817,213 | Miner | Dec. 24, 1957 |